United States Patent
Mayer et al.

(10) Patent No.: US 9,967,490 B2
(45) Date of Patent: May 8, 2018

(54) TIME DELAY INTEGRATION IMAGE SENSOR WITH DETECTION OF TRAVELLING ERRORS

(71) Applicant: E2V SEMICONDUCTORS, Saint Egreve (FR)

(72) Inventors: Frédéric Mayer, Voiron (FR); Bertrand De Monte, Saint Egreve (FR)

(73) Assignee: E2V SEMICONDUCTORS, Saint Egreve (FR)

( * ) Notice: Subject to any disclaimer, the term of this patent is extended or adjusted under 35 U.S.C. 154(b) by 295 days.

(21) Appl. No.: 14/765,362

(22) PCT Filed: Feb. 6, 2014

(86) PCT No.: PCT/EP2014/052294
§ 371 (c)(1),
(2) Date: Aug. 3, 2015

(87) PCT Pub. No.: WO2014/122198
PCT Pub. Date: Aug. 14, 2014

(65) Prior Publication Data
US 2015/0365619 A1    Dec. 17, 2015

(30) Foreign Application Priority Data
Feb. 7, 2013 (FR) ...................................... 13 51036

(51) Int. Cl.
*H04N 5/335* (2011.01)
*H04N 5/217* (2011.01)
(Continued)

(52) U.S. Cl.
CPC ..... *H04N 5/37206* (2013.01); *H04N 5/23264* (2013.01); *H04N 5/372* (2013.01); *H04N 5/3743* (2013.01)

(58) Field of Classification Search
CPC .. H04N 5/335; H04N 5/3696; H04N 5/23251; H04N 5/2329; H04N 5/2353;
(Continued)

(56) References Cited

U.S. PATENT DOCUMENTS

| | | | |
|---|---|---|---|
| 4,694,316 A | 9/1987 | Chabbal | |
| 6,507,417 B1 * | 1/2003 | Makihira | ............. G06T 7/0004 358/486 |

(Continued)

FOREIGN PATENT DOCUMENTS

| | | |
|---|---|---|
| DE | 102008024417 B3 | 8/2009 |
| WO | 2007/051699 A1 | 5/2007 |

OTHER PUBLICATIONS

International Search Report for PCT/EP2014/052294, dated May 9, 2014.

*Primary Examiner* — Xi Wang
(74) *Attorney, Agent, or Firm* — Hauptman Ham, LLP

(57) ABSTRACT

The invention relates to time delay integration (TDI) image sensors. The sensor includes means for detecting a shift of the sensor with respect to the image. The pixel matrix is divided in the column direction into at least a first and a second sub-matrix (Ma, Mb). On each side of each sub-matrix are arranged groups of additional columns (GRa1, GRb1, GRa2, GRb2). The shifts (Db2−Da2, Db3−Da3, etc.) in relative position of these groups between the first and the second sub-matrices are different from each other and make it possible to detect a relative shift of the sensor during travel. More precisely, the signals originating from groups of columns of same rank associated with the two sub-matrices are compared. The pair of groups that delivers the pair of signals that are closest to each other defines the probable shift of the sensor with respect to the image: this shift is equal to the relative position difference of these two groups.

10 Claims, 6 Drawing Sheets

(51) Int. Cl.
*H04N 5/372* (2011.01)
*H04N 5/374* (2011.01)
*H04N 5/232* (2006.01)

(58) Field of Classification Search
CPC .... H04N 5/341; H04N 5/3212; H04N 5/2254;
G02B 21/244; G02B 21/26; G02B 21/02
USPC ............ 348/301, 241, 308, 294, 211.9, 295;
341/169
See application file for complete search history.

(56) References Cited

U.S. PATENT DOCUMENTS

| | | | |
|---|---|---|---|
| 6,683,293 B1 * | 1/2004 | Wen | H04N 3/1525 250/208.1 |
| 7,227,984 B2 | 6/2007 | Cavan | |
| 7,268,814 B1 * | 9/2007 | Pain | H04N 5/3575 348/294 |
| 2011/0115793 A1 | 5/2011 | Grycewicz | |
| 2012/0287256 A1 * | 11/2012 | Hulsken | G02B 21/361 348/79 |
| 2015/0163423 A1 * | 6/2015 | Yin | H04N 5/3591 348/295 |

\* cited by examiner

TIME DELAY INTEGRATION IMAGE SENSOR WITH DETECTION OF TRAVELLING ERRORS

FIELD

The invention relates to time delay integration image sensors, also called TDI sensors, in which an image of a line of points of an observed scene is reconstituted by adding together successive images taken by several photosensitive rows successively observing one and the same line of the scene as the scene travels in front of the sensor perpendicularly to the rows.

DESCRIPTION OF PRIOR ART

These sensors are for example used in satellite-based Earth observation sensors, or in systems for inspecting objects on conveyor belts. They comprise several parallel rows of photosensitive pixels; the sequencing of the control circuits of the various rows (control of exposure time then reading of the photogenerated charges) is synchronized with respect to the relative travel of the scene and of the sensor, so that all the rows of the sensor see the same line of the observed scene one after the other. The generated signals are then added together point-by-point for each point of the observed line.

The sensors are composed of a matrix of rows and columns of pixels, and the columns are oriented in the direction of relative movement. A problem that may be encountered in these sensors is the risk of imprecise summation of the signals of the pixels in cases where the sensor shifts laterally with respect to the direction of the columns of pixels, or in cases where the travel speed varies with respect to the rate of integration and summation of the charges generated by the pixels belonging to a given column.

These shifts in direction or in speed may notably be caused by lateral vibrations or longitudinal jolts of the relative travel system (for example in the case of a conveyor belt transporting objects to be inspected).

Specifically, it will be understood that if a point of the observed scene passes in front of a column of pixels but changes, during summation, to pass partly in front of another column, the result of the summation will be erroneous. The same applies if the travel is not rigorously synchronized with the durations of integration.

It is possible to act on the mechanical travel system to minimize lateral or longitudinal vibrations thereof, but this is not always possible. It would therefore be beneficial to detect the existence of such vibrations using the sensor itself, either to inform the user of them, or to correct directly, as much as possible, the error generated by a detected vibration.

Patent US 2011/0115793 describes a TDI sensor the pixel matrix of which is divided into two sub-matrices that are shifted laterally with respect to each other by a half-pixel, with a view to doubling the resolution of the sensor. There is also a description of an improvement in resolution obtained by introducing a non-nil angle between the travel direction and the direction of the columns of pixels.

U.S. Pat. No. 7,227,984 describes using several images shifted with respect to each other by a fraction of a pixel, also to improve resolution.

Finally, patent DE 10 2008 024417 B3 describes a TDI sensor with two matrices shifted laterally by a pixel with respect to each other, to obtain the desired resolution even though the (CCD) charge readout registers have a resolution half that of the pixels.

In these documents, there is no detection of lateral or longitudinal shift in the travel over one and the same period of observation of an image line.

SUMMARY

The invention proposes to modify the image sensor to include therein means for detecting errors in relative travel, either laterally or longitudinally, or both at once. Preferably, the sensor will also comprise means for modifying the summations carried out, in order to at least partly correct the consequence of these errors.

To do this, the matrix sensor, which includes N rows and P columns of pixels, is divided into several sub-matrices of P columns, each having a number of rows less than N. For each column, the summation of the signals is done separately in each sub-matrix before a global summation of the signals of the various sub-matrices is carried out. In parallel with the execution of these partial summations any shift in the image between one sub-matrix and the next is observed thanks to groups of additional columns associated with each sub-matrix. The groups of columns that are used for this observation have different positions relative to each sub-matrix, so that comparison of the signals produced by the groups of columns associated with the various sub-matrices allows a shift in relative travel to be detected.

If desired, this shift is then used to modify the summation of the image signals observed by the various sub-matrices. For a lateral shift, instead of rigorously adding the signals of one and the same column originating from the various sub-matrices, as would be the case if the travel were defectless, a linear combination is carried out between the signals of a column of a first sub-matrix and the signals of the same column and of neighbouring columns in the other sub-matrices, with an algebraic weighting of the columns of these other sub-matrices as a function of the shift observed between the first sub-matrix and the other sub-matrices. The matrix may be divided into two or more sub-matrices.

Therefore, to summarize, provision is made according to the invention for a time delay integration matrix image sensor, comprising a matrix of N rows and P columns of pixels organized with a constant row and column pitch, with means for summing the signals issued from N pixels having seen one and the same point of an image observed over N steps of charge integration, characterized in that:
  the matrix is divided into at least a first and a second sub-matrix succeeding each other in the column direction, the signals integrated by the columns of a sub-matrix being readable independently of the signals integrated by the columns of the other sub-matrices;
  on each side of each sub-matrix are arranged at least a first and a second group of additional columns associated with this side of the sub-matrix;
  the groups of columns associated with one side of the second sub-matrix are identical to the groups of columns associated with the same side of the first sub-matrix and to each group associated with the first sub-matrix is made to correspond a respective group of the second sub-matrix, the relative position of the second group associated with the first sub-matrix being different from the relative position of the second corresponding group of the second sub-matrix, the relative position of a group being defined with respect to the sub-matrix corresponding to this group, and the difference between said relative positions of the two second corresponding groups being less than the pitch of the pixels of the matrix; and the sensor furthermore comprises means for mutually comparing the integrated signals originating from the corresponding groups of columns of the two sub-matrices and means for selecting, among the pairs of corresponding groups, the one that provides the signals that are closest to each other, the relative position difference of the selected pair of groups representing an item of information about the relative shift between the sensor and the observed image.

The relative positions of the two first groups are preferably identical; they may however be different, but if they are different their difference is not the same as the difference between the positions of the two second groups.

Thus, signals originating from groups of columns that should not see the same image since they are not in the same relative position with respect to the pixel matrix, are compared. If a pair of groups does however see signals that are practically the same, it is deduced therefrom that they have seen the same image and that the position of the sensor with respect to the image has therefore moved during the time that the image has taken to pass from the first sub-matrix to the second.

If the number of groups of pairs of columns is increased and if they are given relative positions that are all different, but all less than the column pitch, more precise information is obtained on the shift between the sensor and the travelling image.

If the matrix is further sub-divided, i.e. if the number of sub-matrices is increased and the number of two-by-two comparisons of the signals originating from pairs of groups of columns is increased, it becomes possible to detect faster relative position variations for a given travel speed. The relative differences of position between corresponding groups of columns of two successive sub-matrices are variable according to the rank of the group.

Finally, if the number of columns in each group is increased, a higher degree of precision is obtained in the comparison of the signals originating from two groups. This is because this comparison is mainly carried out on the overall pattern of the signal at the output of a group of columns.

The difference in position between the relative positions of the groups of two sub-matrices may be a difference in lateral position, i.e. in the row direction, with a view to seeking a lateral shift of the sensor with respect to the image. But it may also be a difference in longitudinal position, in the direction of travel, i.e. in the column direction, with a view to seeking a deviation in the synchronization between the travel speed of the image with respect to the sensor and the rate at which the charges photogenerated in the pixels are integrated and read.

Provision may also be made for the position difference to be both in the row direction and in the column direction. In the latter case, provision may be made for the groups of columns to be associated in sets each of several groups, associated with each sub-matrix; the groups of one and the same set are laterally spaced by one and the same nil or non-nil value, and, for the second sub-matrix, longitudinally shifted with respect to each other by a different distance according to the rank of the group in the set but identical for the groups of same rank of the various sets of the second sub-matrix, the sets of same rank in the series of sets being laterally shifted with respect to each other by a distance that varies according to the rank of these sets.

The sensor according to the invention may be of the type in which the summation is an analogue summation, made by addition of electrical charges, or of the type in which the summation is made by addition of digital signals, or even a sensor with a hybrid analogue and digital summation.

Other features and advantages of the invention will become apparent on reading the following detailed description, given with reference to the appended drawings in which:

DESCRIPTION OF EMBODIMENTS

Figure 1:
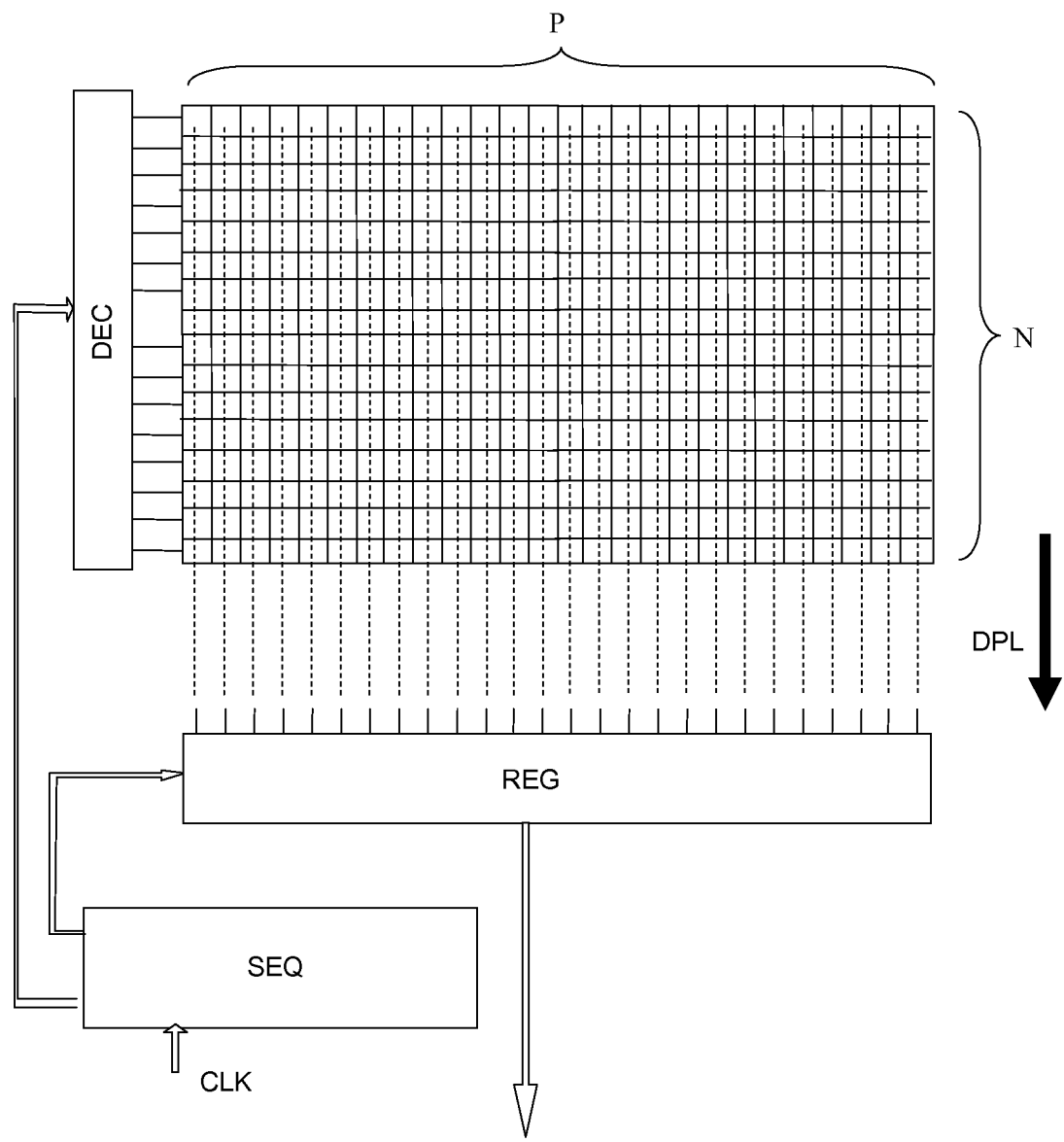
FIG. 1 shows a matrix sensor intended to operate by time delay integration of one and the same image line.

FIG. 1 schematically shows a TDI matrix image sensor, intended to operate with relative travel of the image with respect to the sensor in the direction of the columns of pixels. The arrow DPL indicates this relative direction of movement.

The sensor comprises P columns and N rows of pixels. Each row observes P points of an image line during an integration time $T_i$. The integration of charges is renewed with a period T. If a row of pixels of the sensor observes an image line during a first period, the following row of pixels observes the same image line during the following period, and so on. There is a precise synchronization between the integration period of the sensor and the relative travel speed between the sensor and the observed scene so that the relative movement of the image during the duration T corresponds exactly to a row pitch. If the row pitch is $P_L$ and the travel speed is V, charges are integrated and read cyclically with a period $T=P_L/V$. If there are N rows of pixels, all the rows will successively observe the same image line. Signals corresponding to one and the same image point, which result from the observation of this point by N successive pixels, are added to produce a unique signal representing the illumination of this point. The cumulative signal is delivered at a rate corresponding to the period T.

The manner in which the signal is summed is not discussed here since it is not the subject of the invention: it may be done directly in the form of a summation of electrical charges generated by the illumination (as is the case in CCD time delay integration sensors) or in the form of a digital summation of the results of analogue-digital conversion of sampled voltages representing the charges integrated over each integration period, or else a hybrid summation that is both analogue, for adding the charges, and digital, for adding the digitized signals.

Therefore, we have simply shown, at the bottom of the matrix of N×P pixels, an accumulation register REG that delivers, for each column, the sum of the signals corresponding to the observation of one and the same image point by the N pixels of the column. The operation of this register REG is defined by a sequencer SEQ that also manages the operation of the pixel matrix in order to obtain a synchronized summation, notably by virtue of a row decoder that allows the charges generated in a given row of the matrix to be read at the moment the need to read it arises. The sequencer is controlled by a general clock CLK.

It will be understood that if the relative movement is not rigorously and uniformly parallel to the column direction, or if it is not rigorously synchronized with the periodic operation of the sensor, errors will occur. Specifically, signals originating from pixels that have not seen exactly the same image point will be added. The invention has the aim of detecting and possibly correcting these errors.

Figure 2:
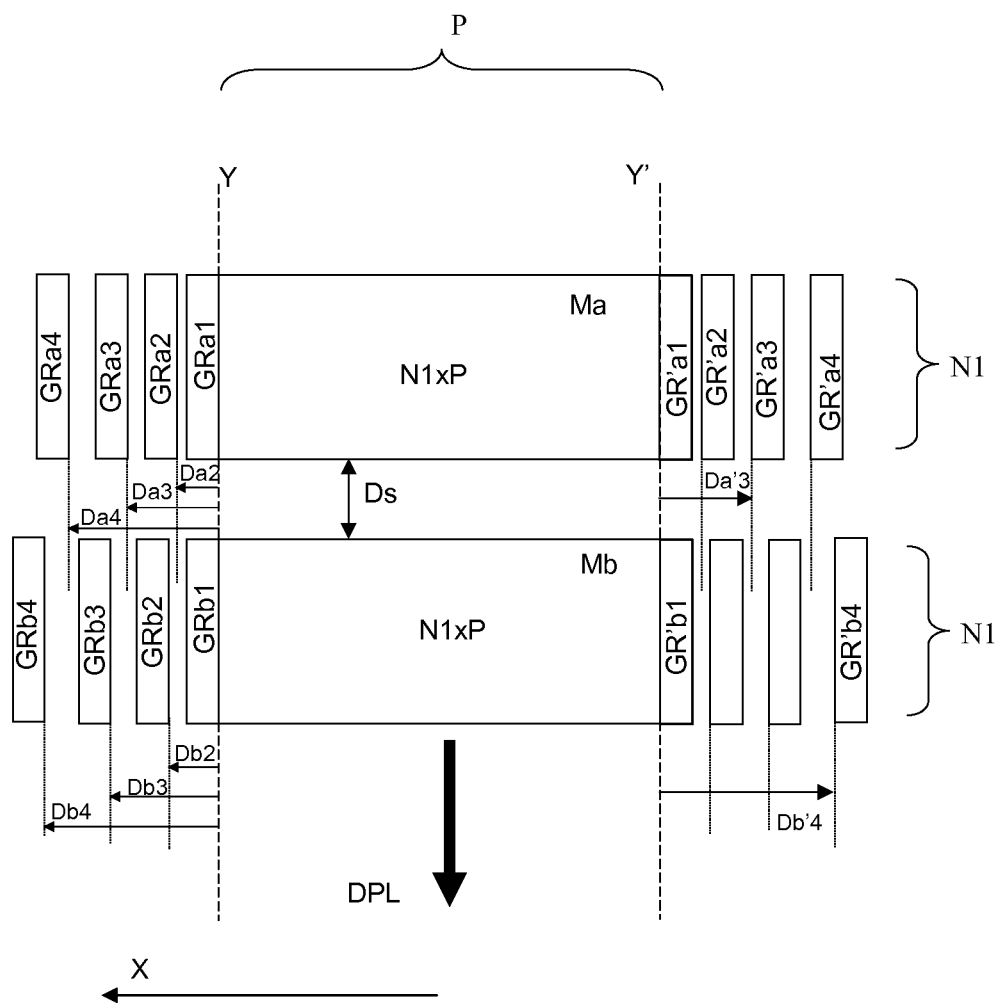
FIG. 2 shows the principle of the organization of the matrix according to the invention, for detecting lateral shifts.

FIG. 2 shows an organization of the pixel matrix for implementing the invention in cases where the aim is to detect lateral shift errors occurring over N integration periods. The pixel matrices have been shown in the form of rectangles.

The matrix of N rows is sub-divided into two sub-matrices Ma and Mb of N1 rows; these two matrices preferably, but not necessarily, have the same number of rows (N=2N1). In other examples the matrix could be sub-divided into more than two sub-matrices, as will be seen further on. Each sub-matrix may be read independently, i.e. the summation of the information from the pixels of one column over the course of the travel is partial and concerns only N1 pixels of one and the same column. However, the results of the summations may be added to carry out the equivalent of a summation over N rows, for each column of the matrix. The two sub-matrices may be separated by a separation distance Ds (for example in order to leave space beneath the sub-matrix Ma for the read, digitization and summation circuits of this sub-matrix). In this case, this distance Ds must obviously be taken into account in the sequencing in order for the image lines seen by the sub-matrix Mb to definitely be the same as those seen by the sub-matrix Ma. The columns of the sub-matrix Ma are aligned with the columns of the sub-matrix Mb.

Additionally, to each sub-matrix, and on each side of the latter, are adjoined additional groups of columns intended for error detection. Each rectangle elongate in the vertical direction in FIG. 2 shows a group of columns. Each group comprises several columns. The groups assigned an index "a" are associated with the sub-matrix Ma; the groups assigned an index "b" are associated with the sub-matrix Mb; the groups situated on the right-hand side are assigned a "prime" index ('), but not the groups situated on the left-hand side. There are at least two groups of columns associated with each side of each sub-matrix; in the example shown there are four groups of columns on each side and they are assigned a respective rank of 1 to 4 according to their separation from the corresponding sub-matrix, the rank 1 being the closest.

The groups GRa1, GRa2, GRa3 and GRa4 are therefore associated with the left-hand side of the sub-matrix Ma, and the groups GR'a1, GR'a2, GR'a3 and GR'a4 with the right-hand side; and there are corresponding groups GRb1 to GRb4, and GR'b1 to GR'b4 for the sub-matrix Mb.

Within a group, the columns are arranged with the same column pitch Pc as the columns of the sub-matrices Ma and Mb.

Two groups of same numerical rank, and situated on one and the same side of the sub-matrices, are considered to form a pair of "corresponding groups", for example the group GRa2 and the group GRb2 are two "corresponding groups", and form the pair of rank 2. Two corresponding groups of columns forming part of one and the same pair are identical. In practice, it is simplest for all the groups of columns to be identical: they all have the same number of columns and the same number of rows; the number of rows is preferably equal to that of the corresponding sub-matrix (N1). The groups of columns observe an image on the edges of the image seen by the sub-matrix. For each column of the lateral groups of columns, the signals are accumulated exactly like those of the main sub-matrices Ma and Mb.

The lateral positions of the groups of columns are defined with respect to the position of the sub-matrix, for example with respect to the left edge of the sub-matrix Ma for the groups of columns GRa1 to GRa4, and with respect to the right edge for the groups GR'a1 to GR'a4.

If the positions are considered with respect to an abscissa axis X in the row direction (horizontal axis) and an ordinate axis Y in the column direction (vertical axis), the groups of columns GRa1 to GRa4 are arranged at respective horizontal distances Db1 to Db4 along the axis X. The ordinate axis Y may be placed on an edge of the main matrix of N rows and P columns. Likewise, the groups GRb1 to GRb4 are at respective distances Db1 to Db4. For the right-hand groups, an axis Y' situated on the other edge may be chosen for abscissa reference; the distances Da'1 to Da'4 and Db'1 to Db'4 are symmetrical with the distances Da1 to Da4 and Db1 to Db4.

In the example shown, the groups of columns of numerical rank 1 are considered to be at a nil distance d (Da1=Db1=Da'1=Db'1=0) from the axes Y or Y', which in practice means that these groups may even form part of the sub-matrix Ma or Mb. Specifically, the columns of these groups are in the continuity of the pitch of distribution of the columns of the whole matrix.

However, the other groups are situated at non-nil distances that represent the respective relative position of the group of columns with respect to the sub-matrix. With the exception of the group of rank 1, for which d=d'=0, the distances d of the groups associated with the sub-matrix Ma are not the same as the distances d' of the groups associated with the sub-matrix Mb. More precisely, for a pair of groups of same rank (also called "corresponding" groups), for example the pair GRa3, GRb3, the difference between the relative position of the group associated with the sub-matrix Ma and the relative position of the corresponding group associated with the other sub-matrix Mb is equal to a fraction of the pitch of distribution of the columns of the sub-matrix; moreover, this difference is not the same for the various corresponding groups: it varies as a function of the rank of the pair of groups. Thus, the differences Db1−Da1, Db2−Da2, Db3−Da3, Db4−Da4 are different from each other and all less than one pitch of distribution of the columns Pc.

The reason for these values of less than one pitch is that it is desired to detect fluctuations in position of less than one column pitch Pc. It would however also be possible to add other pairs of groups of columns with a relative position difference of greater than one pitch.

By way of example, if there are 4 groups of columns as shown, and it is desired to detect position errors in increments of a quarter of the pitch Pc, the relative positions will be chosen such that Db1−Da1=0, Db2−Da2=Pc/4; Db3−Da3=Pc/2; and Db4−Da4=3Pc/4.

The relative position difference d'−d for the pairs of successive groups of increasing rank is therefore preferably a succession of integer multiples of a fraction of the pixel pitch Pc.

In FIG. 2 the values of these distance differences have been exaggerated; these values are fractions of the column pitch Pc, but the column pitch is too small for it to be possible to show it in the figure since there are several hundred columns in the matrix.

In FIG. 2, there are considered to be four groups of columns associated with each side of each sub-matrix, but the invention is applicable provided that there are at least two thereof, namely at least a first group of columns and a second group of columns, and at least the second group of columns (GRb2) associated with a sub-matrix (Mb) is at a relative position that is not the same as the relative position of the second corresponding group of columns (GRa2) associated with the other sub-matrix (Ma). The first group of columns (GRb1) associated with the second sub-matrix may have the same relative position as the first group of columns (GRa1) associated with the first sub-matrix.

Travel error is detected in the following way: the columns of each group of several columns deliver, at the end of a duration $N1 \times T$ equal to N1 integration periods, accumulated signals (accumulated over N rows) representing an image point (it is assumed that the columns of the groups observe a non-uniform image). The profile of signals originating from a group of columns of index "a" is compared with the profile of signals subsequently delivered by the corresponding group of same rank and of index "b". The comparison must concern the same observed image line, and therefore it must take into account the temporal shift due to the number of rows N1 (shift by $N1 \times T$) and due to the separation distance Ds (additional shift equal to $T \times Ds/P_L$, $P_L$ being the row pitch). In other words, if the signal profile originating at the instant t from a group of columns associated with the sub-matrix Ma is observed, this profile must be compared with the profile originating from the corresponding group associated with the sub-matrix Mb at the instant $t+N1 \times T+T \times Ds/P_L$.

The comparison is made two-by-two for all the pairs of corresponding groups of same rank, and this on each side of the sub-matrices.

The expression "signal profile of a group of columns" is understood to refer to the various signal values delivered by the various columns of the group being considered at a given moment.

The comparison that delivers the closest profiles is determined.

If the closest profiles are those of the pair GRa1, GRb1, it is considered that there is no travel deviation.

If the closest profiles are those of the pair GRa2, GRb2, it is considered that there has been a deviation equal to Db2−Da2 to the left during the image movement from the sub-matrix Ma to the sub-matrix Mb.

If the closest profiles are those of a pair of higher numerical rank on the left side, it is considered that there has been an even larger deviation, Db3−Da3 or Db4−Da4.

If the closest profiles are those of a pair situated on the other side of the matrix, it is considered that the deviation is in the other direction and, once again, all the larger when the rank of the pair is higher.

In order for the profile to be meaningful, it is necessary for each group of columns to include a sufficient number of columns, for example at least 5 columns but preferably 10 columns or more.

One way of evaluating the difference in signal profiles of two corresponding groups of columns is as follows: the signal integrated over N1 rows is measured for each column of each group; for a given rank, the number of columns for which the difference in the measurements between a column of one group and a corresponding column of the other group is below a given threshold is counted; if this number is small it is because the two groups of columns of same rank have not seen the same image; if it is high, it is because the two groups have probably seen the same image; the results are compared for the different ranks from 1 to 4, and the rank (and therefore the pair of corresponding groups) for which the number of columns thus counted is the highest is selected; it is for this rank that the signal profiles coincide the best.

Another way of comparing the results of the pairs of groups consists in calculating a quadratic sum of the differences in signal between the columns of same rank (rank inside the group) of a pair of corresponding groups, and in selecting the pair for which this quadratic sum is the smallest.

Having identified the shift, preferably measured in fractions of the column pitch Pc, over the duration $N1 \times T+T \times Ds/P_L$, it may be used to carry out a correction on the main image of $2 \times N1 \times P$ pixels resulting from the addition of the signals (shifted in time) originating from the sub-matrices Ma and Mb. Instead of purely and simply adding the signals originating from corresponding columns of the sub-matrices Ma and Mb, a column of the sub-matrix Ma is added to a combination of the information originating from the same column in the sub-matrix Mb and the information originating from a neighbouring column (on the side of the observed shift), with a weighting dependent on the value of the observed shift.

Thus, if the misalignment observed between the sub-matrices Ma and Mb has a value Pc/q, q being an integer, the signal originating from a column of the sub-matrix Ma is added to the signal originating from the same column of the sub-matrix Mb, but weighted by the value (1−1/q), and to the signal originating from the neighbouring column (on the side of the shift) of the sub-matrix Mb, weighted by the value 1/q.

The accumulation of signals thus obtained from $2 \times N1$ rows is thus partly corrected for the effect of the detected misalignment.

If the sub-matrices do not have the same number of rows and therefore deliver signals of different amplitude for one and the same image, this is taken into account when calculating the correction to apply.

Above, the matrix was divided into two parts Ma and Mb. It may however be divided into a larger number of sub-matrices, each of N2 rows. In this case, lateral groups of columns having different lateral relative positions between one sub-matrix and the next sub-matrix are associated with each sub-matrix.

Figure 3:
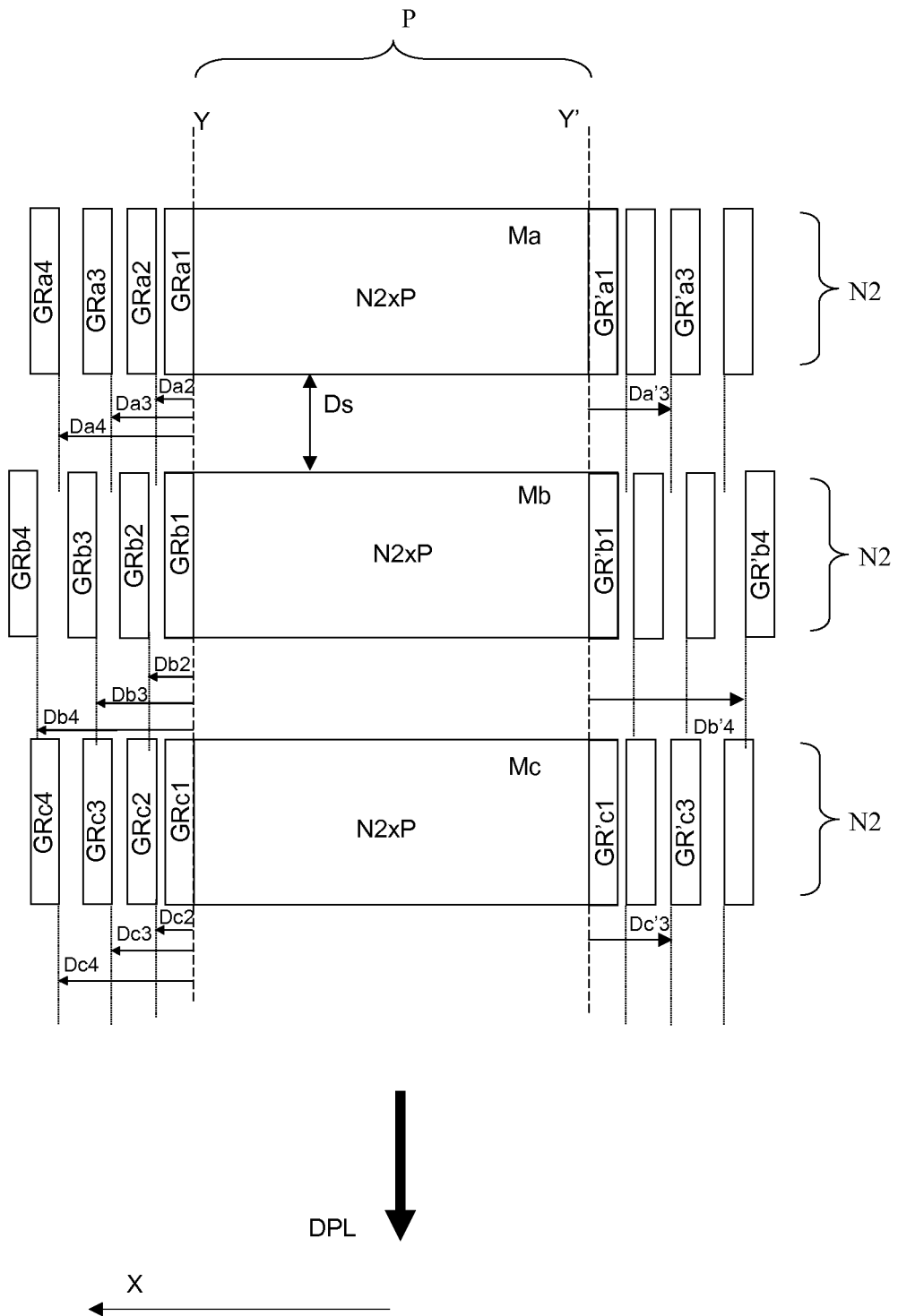
FIG. 3 shows an organization of the sensor with a subdivision of the matrix into three parts.

For example, in the configuration in FIG. 3, a third sub-matrix Mc has been provided; the matrices have N2 rows each with $N=3 \times N2$. To simplify, the relative positions of the groups of columns associated with the third sub-matrix have been chosen to be the same positions as those of the groups associated with the first sub-matrix Ma. Thus, these relative positions are different from those of the groups associated with the sub-matrix Mb. For example, the positions Dc2, Dc3, Dc4 are such that Dc2−Db2=−Pc/4, Dc3−Db3=−Pc/2, and Dc4−Db4=−3Pc/4 if shifts with a resolution of a quarter of pixel pitch are considered, as in the preceding example. It is of course necessary to take into account the fact that any shift that occurs between the sub-matrices Mb and Mc has the opposite sign to shifts that occur between the sub-matrices Ma and Mb.

For the comparison of the signals originating from the groups associated with the two sub-matrices Mb and Mc, the temporal shift resulting from the position of the sub-matrix Mc with respect to the sub-matrix Mb is taken into account, in the same way that the shift Ds between the sub-matrices Ma and Mb was taken into account.

The shift of the sub-matrix Mc will therefore be determined with respect to the sub-matrix Mb, but for the error correction, it is the overall shift of the matrix Mc with respect to the sub-matrix Ma that will have to be determined, by algebraic addition of the shifts of the sub-matrix Mb with respect to Ma and of the sub-matrix Mc with respect to the sub-matrix Mb.

If there is a fourth sub-matrix, it is easiest to arrange the groups of columns in the same positions as those that are associated with the second sub-matrix, and so on.

Figure 4:
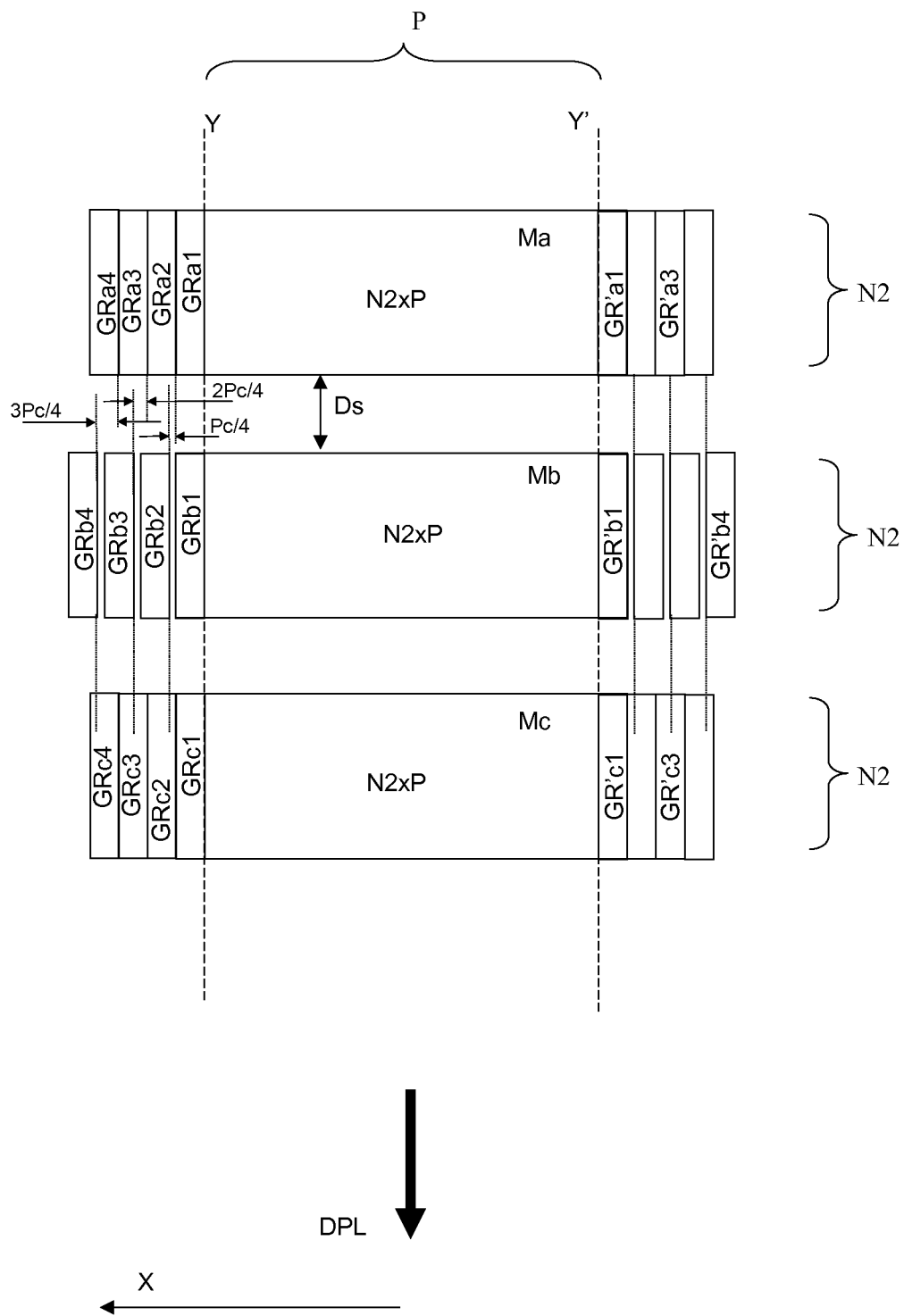
FIG. 4 shows a simple example embodiment with three sub-matrices.

FIG. 4 shows a simple arrangement in which the relative positions of the groups associated with the first sub-matrix Ma are multiples of the column pitch, i.e. all the columns of all the groups are in the continuity of the column pitch of the sub-matrix Ma. In this case, it is enough for the various groups of columns of the sub-matrix Mb to be offset from the group of preceding rank by one and the same fraction of the column pitch. For example, the group GRb2 is separated from the group GRb1 by a quarter of a pitch Pc/4; the group GRb2 is separated from the group GRb2 by the same distance Pc/4 and the group GRb4 is separated from the group GRb3 by the same distance Pc/4. The result is that the groups of rank 1 are aligned, the groups of rank 2 are shifted by Pc/4, the groups of rank 3 are shifted by Pc/2, and the groups of rank 4 are shifted by 3Pc/4. If there is a third matrix, as is the case in FIG. 4, it is easiest to arrange the groups associated with the third matrix in the same way as those of the first matrix, as was the case in FIG. 3.

Figure 5:
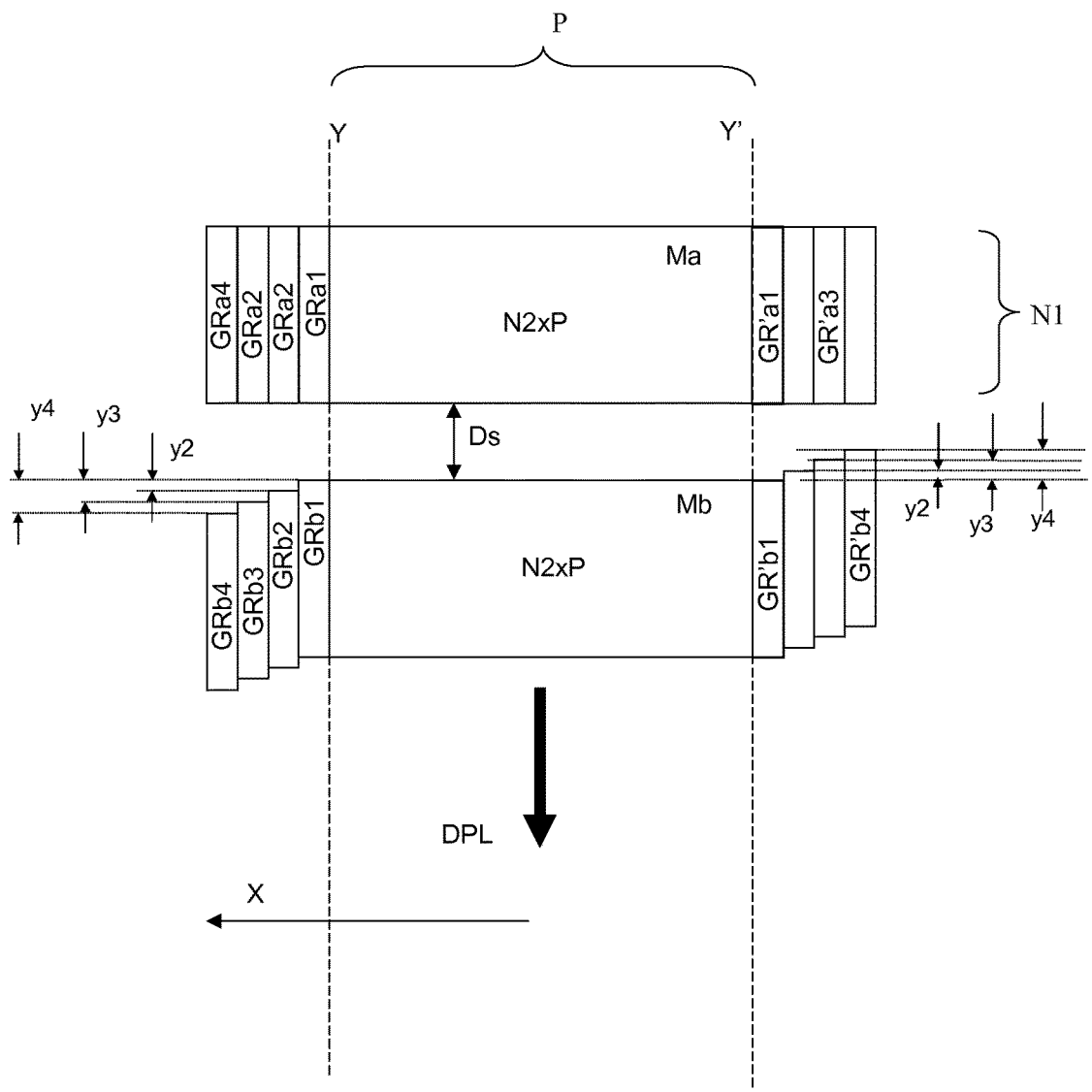
FIG. 5 shows an organization of the sensor for detecting an error of travel speed.

FIG. 5 shows an organization of the matrix sensor for detecting and possibly correcting an error of travel speed between the sensor and the image.

The sensor once more includes a matrix sub-divided into several sub-matrices, here two sub-matrices Ma and Mb, each containing N1×P pixels. It also includes several groups of columns associated with each of the sides of each of the sub-matrices. Unlike FIGS. 2 to 4, the columns of groups of same rank associated with the two sub-matrices Ma and Mb are aligned in the direction of travel: there is no lateral shift between groups of same rank. This is true for all the groups of columns.

However, groups of columns of increasing rank are shifted longitudinally with respect to each other. This shift is here again counted from the respective sub-matrix. Thus, the group GRb1 has a nil longitudinal shift with respect to the group GRa1. The group GRb2 has a shift y2 of a fraction of a pitch (for example a quarter of a pitch) row-wise with respect to the group GRa2. The group GRb3 has a shift y3 twice as large as y2, and the group GRb4 has a shift y4 three times larger than y1. The pixels of the groups of columns associated with the matrix Mb are therefore longitudinally shifted by a fraction of a pixel with respect to the corresponding pixels of the groups associated with the matrix Ma.

On the right-hand side of the matrix, the shifts are in the opposite direction to those on the left-hand side, in order to allow the detection of a variation in synchronization in the reverse direction.

A shift is once more detected by comparing the signal profiles originating from the various groups of same rank. If the best correspondence between profiles is that of the groups of rank 2 for example (GRa2 and GRb2), it is probable that a synchronization defect corresponding to a longitudinal shift y2 has occurred. It is possible to take this shift into account when adding the signals originating from the two sub-matrices. Instead of adding the raw signals of pixels having theoretically seen the same image point, the signals of a pixel of the matrix Ma will be added to a linear combination of two pixels of the matrix Mb with weighting coefficients (m−1)/m and 1/m, m being an integer, and 1/m here denoting the fraction of row pitch for which the best correspondence was found. Thus the detected shift is at least partly compensated for.

Figure 6:
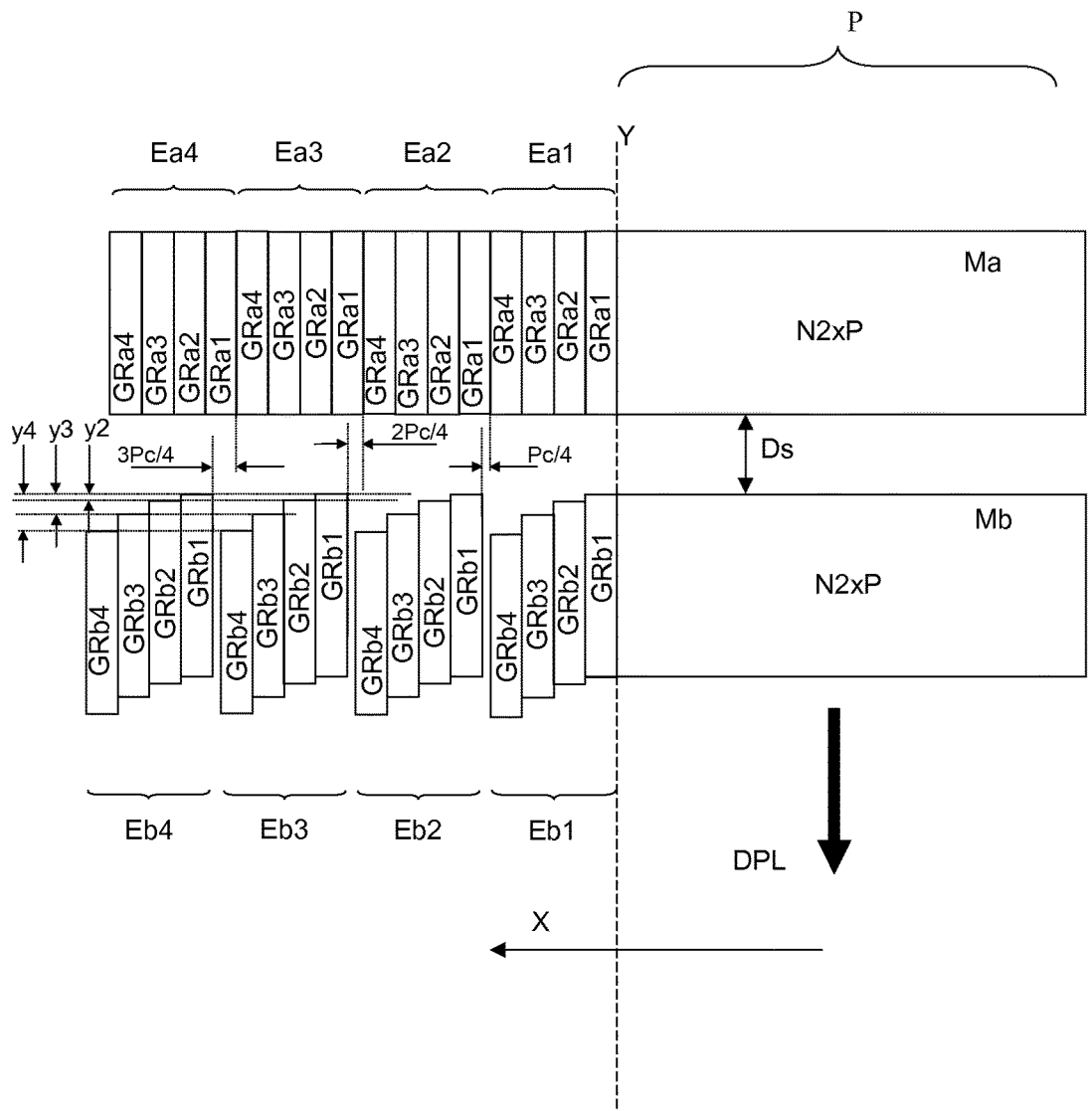
FIG. 6 shows an organization for the combined detection of a lateral shift and of a travel speed error.

Finally, FIG. 6 shows a way of combining the detection of lateral shifts and longitudinal shifts. To simplify, it is considered that there are only two sub-matrices, but the principle may be extended to a larger number of sub-matrices. The groups of columns associated with the sub-matrix Ma are organized into several sets Ea1, Ea2, Ea3, Ea4 the rank of which increases as their offset with respect to the sub-matrix increases; in each set there are four groups of columns GRa1, GRa2, GRa3, GRa4. Likewise, the groups of columns associated with the sub-matrix Mb are organized into sets Eb1, Eb2, Eb3, Eb4 each corresponding respectively to the set of same rank associated with the sub-matrix Ma; and in each set there are four groups of columns GRb1, GRb2, GRb3, GRb4 each corresponding to a respective group of same rank of the corresponding set associated with the sub-matrix Ma. There are sets of groups on both sides of the sub-matrix but only the sets situated on the left of the sub-matrix have been shown.

The lateral shifts are set equal to multiples of 0 to 3 of a quarter of the column pitch. These are the shifts between two groups of same rank belonging to two sets of same rank. They depend only on the rank of the set; they do not depend on the rank inside the set because the lateral shift is the same for all the pairs of groups having the same rank in the set and belonging to two sets of same rank.

The longitudinal shifts are indicated as having values 0, y2, y3, y4 for increasing ranks; these values may also be fractions of a pixel row pitch. In the same way as for lateral shifts, these are the shifts between two groups of same rank belonging to sets of same rank. The longitudinal shift depends on the rank of the pair in a set but it does not depend on the rank of the set because the shifts are distributed in the same way for all the sets whatever their rank.

The signals resulting from groups of columns belonging to two sets of same rank and having the same rank inside the set, are compared, and this to the left and right of the matrices. Thus, for example, the signals of the group GRa3 of the set Ea2 are compared with the signals of the group GRb3 of the set Eb2 on the left of the matrix. The comparison that gives the best result among all the comparisons defines a rank of pairs of groups of columns, and a rank of sets to which they belong. The lateral shift is the lateral shift between the two sets of this rank. The longitudinal shift is the longitudinal shift between the groups of the pair.

The arrangement in FIG. 6 therefore allows a simultaneous determination of the lateral shift and of the longitudinal shift during travel from one sub-matrix to the next.

The shift is corrected by linearly combining both pixels of neighbouring rows, to take into account the longitudinal shift, and neighbouring pixels to take into account the lateral shift.

The invention claimed is:

1. A time delay integration matrix image sensor, comprising:
   a matrix of N rows and P columns of pixels organized with a constant row and column pitch, with digitization and summation circuits configured to provide integrated signals issued from N pixels having seen one and the same point of an image observed over N steps of charge integration, wherein the matrix is divided into at least a first and a second sub-matrix succeeding each other in a column direction, the signals integrated by the columns of a sub-matrix being readable independently of the signals integrated by the columns of the other sub-matrices, on each side of each sub-matrix are arranged at least a first and a second group of additional columns associated with this side of the sub-matrix, the groups of columns associated with one side of the second sub-matrix are identical to the groups of columns associated with the same side of the first sub-matrix, a group associated with the first sub-matrix corresponding to a respective group of the second sub-matrix, the relative position of the second group associated with the first sub-matrix being different from the relative position of the second corresponding group of the second sub-matrix, the relative position of a group being defined with respect to the position of the sub-matrix corresponding to this group, and the difference between said relative positions of the two second corresponding groups being less than the pitch of the pixels of the matrix, and the sensor furthermore comprises circuitry configured to mutually compare the integrated signals originating from pairs of corresponding groups of columns of the two sub-matrices and select, among the pairs of corresponding groups, a pair that provides the signals that are closest to each other, the relative position difference of the groups of the selected pair representing an item of information about the relative shift between the sensor and the observed image.

2. The image sensor according to claim 1, further comprising, on each side of each sub-matrix, at least a third group of columns, the third group of columns associated with one side of the second sub-matrix being identical to the third group of columns associated with the same side of the first sub-matrix, the relative position difference between the third groups associated with the two sub-matrices being less than a pixel pitch and being different from the difference between the relative positions of the second groups.

3. The image sensor according to claim 1, wherein the matrix is divided in the column direction into at least three sub-matrices, with several groups of columns associated with each sub-matrix and each having a corresponding group associated with each of the other sub-matrices, the relative position differences between corresponding groups of columns of two successive sub-matrices being variable according to a rank of the group.

4. The image sensor according to claim 1, wherein the relative position difference is a position difference in a row direction, with a view to seeking a lateral shift of the sensor with respect to the image.

5. The image sensor according to claim 1, wherein the relative position difference is a position difference in the column direction, with a view to seeking a deviation in the synchronization between a travel speed of the image with respect to the sensor and the rate at which the charges photogenerated in the pixels are integrated and read.

6. The image sensor according to claim 4, wherein the relative position difference includes both a difference in the row direction and a difference in the column direction.

7. The image sensor according to claim 1, wherein the columns of the various groups are arranged, inside each group, at the same pitch as the columns of the sub-matrices, the first group of columns of the first and second sub-matrices being arranged in the continuity of the pitch of the columns of the corresponding sub-matrix, the second group of the first sub-matrix being laterally spaced with respect to the first group by a given nil or non-nil distance d and the second group of the second sub-matrix being laterally shifted by a different distance d', the absolute value of the difference d'−d being less than the column pitch.

8. The image sensor according to claim 7, further comprising at least a third group of columns on each side of each sub-matrix, the third group of columns associated with one side of the second sub-matrix being identical to the third group of columns associated with the same side of the first sub-matrix, the relative position difference between the third groups associated with the two sub-matrices being an integer multiple of a fraction of the column pitch.

9. The image sensor according to claim 1, wherein the columns of the various groups are arranged, inside each group, at the same pitch as the columns of the sub-matrices, the first group of columns of the first and second sub-matrices being arranged in the continuity of the column pitch Pc of the corresponding sub-matrix, the second group of the first sub-matrix being also situated in the continuity of the column pitch, and the second group of the second sub-matrix being laterally shifted from the first group of the second sub-matrix by a fraction Pc/q of the column pitch, q being an integer.

10. The image sensor according to claim 1, further comprising several sets of several groups of columns associated with each sub-matrix, the groups of one and the same set being laterally spaced by one and the same nil or non-nil value, and, for the second sub-matrix, longitudinally shifted with respect to each other by a different distance according to the rank of the group in the set but identical for the groups of same rank of the various sets of the second sub-matrix, the sets of same rank in the series of sets being laterally shifted with respect to each other by a distance that varies according to a rank of these sets.

* * * * *